July 21, 1970  R. S. ALFANDARI ET AL  3,521,196
MICROWAVE CIRCUITS UTILIZING FERRITE MODE TRANSFORMERS
Filed May 19, 1965  2 Sheets-Sheet 1

INVENTORS
ROGER SALOMON ALFANDARI,
ROBERT PAUCHARD,

BY Stone & Mack.

ATTORNEYS

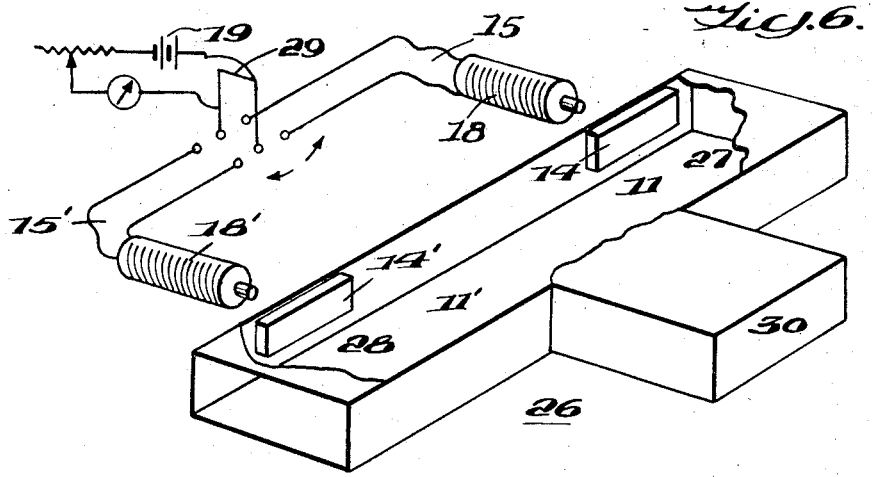
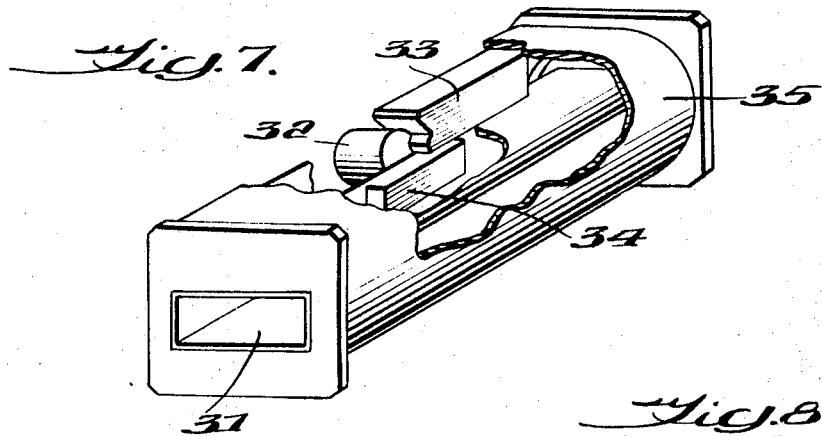
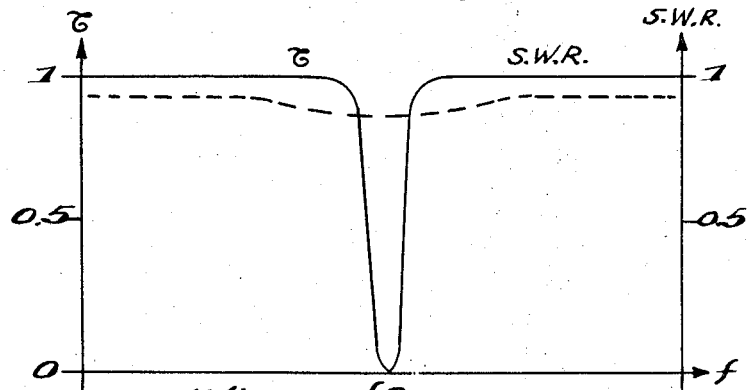
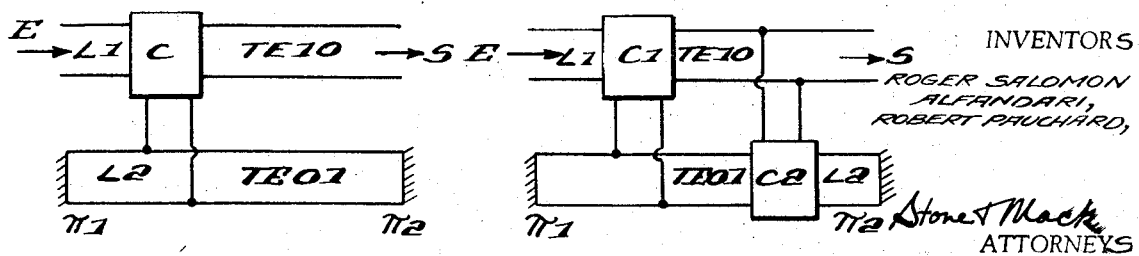

3,521,196
MICROWAVE CIRCUITS UTILIZING FERRITE MODE TRANSFORMERS
Roger Salomon Alfandari, Paris, and Robert Pauchard, Cachan, France, assignors to Compagnie Francaise Thomson-Houston-Hotchkiss Brandt, Paris, France, a Corporation of France
Continuation-in-part of abandoned application Ser. No. 116,101, June 9, 1961. This application May 19, 1965, Ser. No. 457,094
Claims priority, application France, June 9, 1960, 829,527, Patent 1,272,519
Int. Cl. H01p *1/16, 1/10, 1/20*
U.S. Cl. 333—7
12 Claims

ABSTRACT OF THE DISCLOSURE

The invention relates to selective-action mode transformers or converters or microwave structures capable of converting the mode of microwaves traveling therethrough from one type to another, and more precisely from a $TE_{n0}$ type mode to a $TE_{0p}$ mode and vice versa. The invention is based on the discovery of a mode conversion effect which was observed by the applicants to occur in wave guides upon a novel application of magnetized ferrite material therein. The imposition of a transverse magnetic field perpendicular to the plane of polarization of a guided U-H-F wave in a ferrite element positioned in the guide, transforms an incident $TE_{10}$ wave into a $TE_{01}$ (more broadly a $TE_{n0}$ into a $TE_{0p}$ wave) and vice versa. The effect may be reciprocal, i.e., hold for either direction of wave propagation or it may be non-reciprocal. The mode-conversion effect is found to occur when an elongated ferrite element is positioned in a wave guide with its major direction parallel to the direction of propagation of the waves through the guide and near a narrow wall of the guide, and when the element is exposed to a magnetic field essentially normal to the plane of polarization of the incident wave.

---

This application is a continuation-in-part of application Ser. No. 116,101, Roger Salomon Alfandari and Robert Pauchard filed June 9, 1961 for Ferrite Mode Transforms now abandoned.

The present invention relates to selective-action mode transformers or converters, that is to say microwave structures capable of converting the mode of microwaves traveling therethrough from one type to another, and more precisely from a $TE_{n0}$ type mode to a $TE_{0p}$ mode and vice versa. The invention also relates to various electronic apparatus embodying such structures:

The invention is based on the discovery by the applicants of a mode conversion effect, not previously reported in the literature, and which was observed by them to occur in wave guides upon a novel application of magnetized ferrite material therein. In accordance with that discovery; the imposition of a transverse magnetic field perpendicular to the plane of polarization of a guided U-H-F wave in a ferrite element suitably positioned in the guide, in a manner to be specified, transforms an incident $TE_{10}$ wave into a $TE_{01}$ (more broadly a $TE_{n0}$ into a $TE_{0p}$ wave) and vice versa. The effect may be reciprocal, i.e. hold for either direction of wave propagation or it may be non-reciprocal, depending on certain conditions of symmetry to be specified herein. Even though this disclosure is directed to the conversion of the fundamental modes, i.e., from the $TE_{01}$ to the $TE_{10}$ mode, or broadly from the $TE_{0n}$ to the $TE_{n0}$ mode there is no theoretical impossibility to extend this conversion from the $TE_{n0}$ mode to the $TE_{0p}$ mode provided the guide itself is dimensioned so as to propagate such modes.

It will be understood that the phrase "plane of polarization" is here used with the meaning generally accepted in radio theory as designating the plane containing both the direction of propagation of the wave through the guide and the electric vector of the wave. In the case of a rectangular wave guide, with the usual conventions, the plane of polarization parallels the narrower side of the guide.

The mode-conversion effect on which the invention is based is found to occur when an elongated ferrite element is positioned in a wave guide with its major direction parallel to the direction of propagation of the waves through the guide and near a narrow wall of the guide, and when the element is exposed to a magnetic field essentially normal to the plane of polarization of the incident wave.

This novel effect is distinct from the so-called Faraday effect which occurs when the ferrite is subjected to a magnetic field parallel to the direction of wave propagation, as well as from other gyromagnetic or resonance effects. A theoretical explanation of the novel effect as well as a brief description of experiments which demonstrate the reality thereof, may be found in a paper read by the applicants before the French Academy of Sciences and published in Comptes-Rendus, vol. 251, pages 1738–1740.

It has been found that the central frequency of the wave at which the mode conversion occurs, is primarily affected by the strength of the magnetic field applied; the bandwidth over which the effect occurs depends mostly on the relative geometry of the ferrite and the guide; while the degree to which the conversion effect is reciprocal, depends mainly on the symmetry relationship between the magnetic field and the ferrite element. Thus, in the usual case of a non-uniform magnetic field, i.e. a field created in a domain having a limited cross-section in a plane parallel to the plane of polarization, the device will generally be reciprocal if the centre axis of the field coincides with the longitudinal plane of symmetry of the ferrite element, and non-reciprocal if the field axis is above or below said plane of symmetry.

Before describing specific embodiments of the invention, certain properties of the magnetic fields preferably used according to the invention for magnetizing the ferrite elements thereof, will be set forth with reference to FIGS. 1 and 2.

The applicants have determined that quite remarkable selective effects are obtained by subjecting a ferrite element arranged in a wave guide to a non-uniform magnetic field which is not rectilinear except inside a cylinder of small diameter. FIG. 1 represents the lines of force of such a field, the lines of field 1–2–3 spread about the axis *oz* of the narrow cylinder 5.

The new effects which the applicants use in the devices which form the subject of the present invention are obtained when such a magnetic field is applied, in the conditions defined below and illustrated by FIG. 2, to a wave guide 8 containing a ferrite element 6. This latter, which is, for instance, of parallelopiped form, must have its larger dimension running in the direction of propagation *oy* of the energy in the guide 8. It is arranged near a narrow wall 9 of this guide. The magnetic field to which the ferrite element is subjected has a component following an axis orthogonal to the plane P of polarization of the incident wave. It will be clearly apparent from FIGS. 1 and 2 that the lines of force of the magnetic field (such as 1, 2, 3, FIG. 1), are symmetrically related as far as their angles are concerned. Insofar as the position (rather than the angle) of the magnetizing field is concerned, it is equally evident from the drawings that such position may coincide with the median longitudinal plane of the element 6 normal to the electric vector E (i.e. may be symmetrical with respect to the ferrite element) or may be displaced away from said median plane (i.e. may be asymmetrical with respect to said element). In the former case, that is when the field position is symmetrical, it is found that the mode-converting action of the devices of the invention is reciprocal; in the second case, i.e. with asymmetrically positioned field, the mode-converting action is found to be non-reciprocal.

To produce the conversion effect, it is necessary according to the invention that the lines of force emanating from element 5, which obviously is a magnet, be perpendicular to the narrow wall of the guide. Now, in reality, the lines of force are symmetrically positioned with respect to a main line which follows the axis of the element 5. The longitudinal plane of the ferrite element which is referred to, is that which contains the axis of the cylinder, and hence the main component of the applied magnetizing field. If this plane is further the median longitudinal plane of the ferrite element and if the main component of the field is contained in this plane, the observed conversion is reciprocal, whereas if this component is outside this plane, the conversion is not reciprocal. If this component is in the plane, it can be displaced in the plane all along the ferrite element, and provided, this component remains normal to the narrow wall of the guide, the conversion effect remains reciprocal. The angular symmetry which has been introduced, refers to the relative position of the lines of force emanating from the magnet 5 with respect to a longitudinal plane containing this main line, but the location of the magnet with respect to the narrow wall of the guide may be chosen so that the extreme divergent lines of force have no action upon the ferrite element which in fact remains subjected to the lines of force being substantially perpendicular to the plane of polarization of the wave propagating in the guide.

In resumé, the lines of force of the magnetizing field are symmetrical with respect to the axis of the field and hence symmetrically related with respect to a longitudinal plane containing this axis. If this plane is the median plane of the ferrite element the conversion is reciprocal, if not, it is not reciprocal.

It will readily be understood that the conversion of a wave from the $TE_{10}$ to the $TE_{01}$ mode or vice versa will usually result in the wave being reflected from a plane substantially coincident with a terminal plane of the ferrite element. Thus, when a wave of predetermined ultra-high frequency $f$ is propagated in a guide, the position of the axis $\Delta$ being fixed, the value of the external magnetic field may be adjusted so that the wave is no longer transmitted, but reflected, the coefficient of reflection being about minus 1.

A wave of frequency relatively close to $f$ is transmitted without particular attenuation, the coefficient of reflection then being little different from 0.

The same reflection phenomenon takes place when the axis of the magnetic field is near one of the two terminal planes of the ferrite element, which are perpendicular to the axis of propagation of the energy.

It should be noted that this phenomenon is reciprocal when the axis of the magnetic field (in the above-mentioned case of a non-uniform field) passes through the longitudinal axis of the ferrite element, as already pointed out above.

In the case where the non-uniform external magnetic field does not pass through the axis of the ferrite element, the phenomenon is no longer reciprocal and the losses in this element become somewhat more considerable.

The phenomena change their appearance somewhat when the magnetic field intensity is relatively small (lower than a hundred Oe., for example).

The energy of the high frequency wave is then almost completely absorbed in a very narrow frequency band, the attenuation being practically nil outside this band and in particular in the neighborhood of its limits.

The present invention has for an object to provide selective band-cutting filters and other devices which make use of the properties of the novel ferrite converters between the two fundamental modes $TE_{10}$ and $TE_{01}$, defined above, by means of the application of an external magnetic field to a ferrite element arranged in a guide. The mode converter then allows the two modes to be converted into each other or coupled together in a more or less complete, more or less reciprocal and more or less selective manner.

The invention is based upon the so-called mode conversion appearing when a rectangular wave guide containing a ferrite element suitably disposed therein, is subjected to a magnetic field applying perpendicularly to the narrow wall of the guide along which the ferrite element is located.

The invention will now be further described with reference to the accompanying drawings which illustrate various embodiments thereof selected by way of illustration but not of limitation.

FIG. 6 shows a wave guide switch which comprises two filters identical to that of FIG. 3.

FIG. 7 shows a very selective but non-reciprocal filter which is in accordance with a second embodiment of the invention.

FIG. 8 is a diagram comprising two curves which show, as a function of the frequency $f$, variations of the coefficient of transmission $\tau$ of the filter in FIG. 4 and the variations in the standing wave ratio therein.

FIG. 9 is an equivalent diagram of the selective filters already described.

FIG. 10 shows a two-cell filter constituted by the association in series of two single filters with circuits identical to that in FIG. 9.

Figure 1:
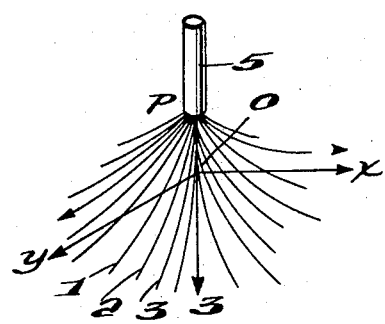
FIG. 1 shows the lines of forces of a magnetic field created in a cylindrical magnet.
Figure 2:
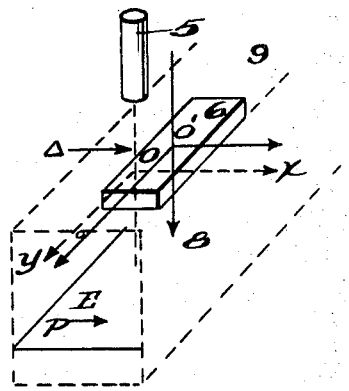
FIG. 2 shows a rectangular wave guide containing a ferrite element the large dimension of which runs along the direction of propagation of the energy in the guide and subjected to a magnetic field normal to the polarization plane of the incident wave in the guide.
Figure 3:
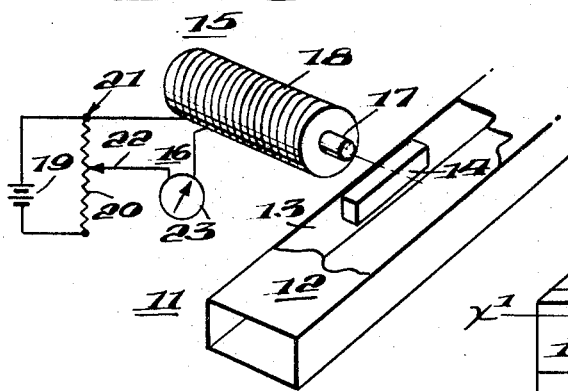
FIG. 3 shows a reciprocal and lossless filter according to the invention.

The selective and reciprocal filter 11 of FIG. 3 comprises a wave guide section 12 with a rectangular cross section, along the narrow wall 13 of which is arranged a parallelopiped ferrite element 14, equidistant from the wide walls of the guide. The large sides of said element are parallel to a median line of the guide.

An electromagnet 15 is constituted by a core 17 of soft iron surrounded by a winding 18 and an excitation circuit 16 for said winding comprises a source of direct current 19, which supplies current to the resistance of a regulating potentiometer 20. One of the ends 21 and the slide 22 of the latter are connected by means of the ammeter 23 to the excitation winding 18 of the electromagnet 15.

The magnetic field is perpendicular to the plane of polarization of a wave which is propagated in the wave guide 12. Moreover the axis of the magnetic field must in this embodiment pass through the longitudinal axis of the ferrite element.

Figure 4:
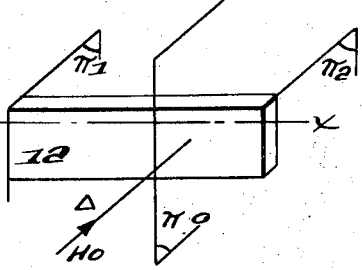
FIG. 4 is a diagram which clearly shows the relative positions of the ferrite element and the axis of the magnetic field.

We will refer to FIG. 4 in order clearly to explain the operative conditions of the filter in FIG. 3. The transverse input and output planes of the guide section partially filled with ferrite are labelled $\pi_1$ and $\pi_2$ and the plane perpendicular to the axis $X'X$ of the guide which contains the axis Δ of the magnetic field $H_o$ is indicated by $π_0$. Since the ferrite element is defined by its length, the wave propagated in the guide having a frequency $f$ and the intensity of the magnetic field having been given, the position of the plane $π_0$ may be determined so that the greater part, indeed almost the whole of the incident energy in the guide is reflected owing to the conversion of the incident wave from one mode such as $TE_{10}$ to the reverse mode such as $TE_{01}$. In these conditions, this reflection phenomenon is limited to a very narrow frequency band. The intensity of the magnetic field applied is of the order of several hundreds of Oe.

In the band in which the mode conversion takes place, there is transmission of only a negligible portion of the incident power. The ratio between the incident power and the transmitted power is higher than 40 db. The greater portion of the incident power is reflected towards the source, the losses in the filter being a few tenths of a decibel. A wave in the frequency which is outside the cut-off band of the filter is transmitted with small attenuation, the order of value of which is independent of the frequency.

Figure 5:
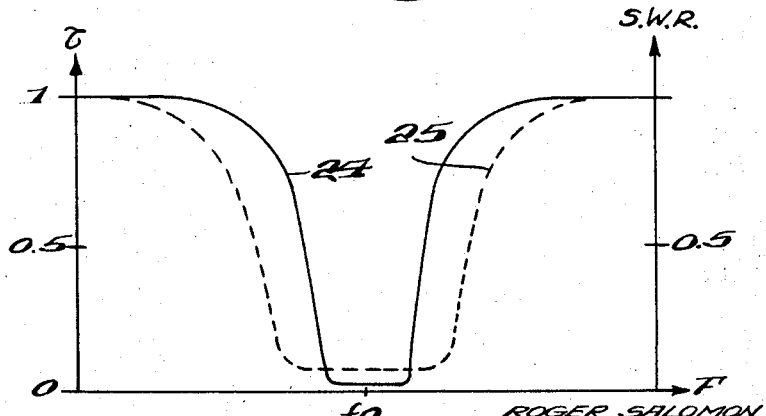
FIG. 5 is a diagram comprising two curves which show, as a function of frequency, the variations in the amount of standing waves of this filter.

The curves 24 and 25 of FIG. 5 which respectively show the variations in the coefficient of transmission $τ$ and the standing wave ratio summarize the properties which have just been described.

The observed phenomenon is reciprocal and independent of the direction of the applied magnetic field.

The filter in FIG. 3 can be used when the wave which is propagated in the guide has a great energy but any excessive heating of the ferrite element, the temperature of which may be limited by external ventilation of the guide, must be avoided. It should be noted that the positioning of this ferrite element against a metal wall of the guide helps the evacuation of the heat dissipated in this element.

Any change in the intensity of the external magnetic field $H_0$ as obtained through adjustment of the exciting current of the electromagnet 15 by means of potentiometer 22 results in a shifting of the response curve of the filter parallel to the axis of the frequencies. When the external magnetic field is cut off the ferrite element behaves like an ordinary dielectric.

A device similar to that in FIG. 3 may be made by using any cross sectional shape of wave guide. It is possible to make filters operating in any high frequency band, but it is best to select the characteristics of the ferrite used according to the end in view. Judicious regulation of the different parameters which determine the filter allows efficiency bands to be obtained, the relative width of which is comprised between $10^{-3}$ and $10^{-1}$, such figures representing a percentage of the operating mean frequency.

It is obvious that the electromagnet 15 may be replaced by a permanent magnet. Displacement of the latter towards and away from the ferrite element then allows the intensity of the field applied to the ferrite element to be regulated with results equivalent to those obtained through adjustment of potentiometer 22 in FIG. 3.

A filter similar to that which has just been described may be made by using two ferrite strips arranged respectively adjacent the opposite narrow walls of the guide, instead of the single ferrite strip shown in FIG. 3. The two strips may be positioned in the guide opposite each other or in longitudinally displaced relation. A magnetic field should then be applied to each ferrite strip.

The filter shown in FIG. 3 has the following advantages: it has a very small bulk (a length of the order of two wavelengths) and its selectivity is very great. The filter is made active by electrical means and the control of the median frequency of its cut-off band is also electrical. Finally the width of the band can be controlled by simple mechanical adjustments which may be effected by means of simple devices which do not add to the bulk of the apparatus.

The switch in FIG. 6 is constituted by a shunt-T (a T whose general plane is parallel to the H vector of the waves) in each opposite brand of which is arranged a filter 11 or 11' identical to that in FIG. 3.

It will be noted that the electromagnets 15 and 15' are supplied from a common excitation source 19 to which the coils 18 and 18' are alternately connectable by means of a two pole changeover switch 29. The left-hand contact of the switch contacts the upper terminal of coil 18 or of 18' whereas the right-hand contact of said switch contacts the lower terminal of coil 18 or of 18' according as coil 18 or 18' is to be connected.

The short circuit planes of each of the two loss-less bandcutting filters 11 and 11' must coincide with the principal planes of the lateral branches 27 and 28 of the T. This means, as will be apparent to those familiar with wave guide theory, that a wave reflected from the outer end surface of the ferrite element 14 or 14' positioned in each of the side legs of the T, must be so phased as to combine additively with the direct wave propagating into the other of the two side legs of the T. Also, the ferrite elements must be so dimensioned and arranged that the impedances are matched for either of the two alternative operating positions of reverser switch 29.

When the electromagnet of the filter 11 is supplied with current by movement of switch 29 to its right-hand position as shown here the incident wave in the central branch 30 of the T is transmitted into the guide connected to the lateral branch 28 of the T. Conversely, when the electromagnet of the filter 11' is supplied with current, by movement of switch 29 to its left-hand position, the incident wave in the branch 30 is transmitted into the guide connected to the lateral branch 27. It is thus possible at will to direct an incident wave from the central branch towards the branch 27 or the branch 28 if its frequency is comprised in the common cut-off band of the filters 11 and 11' (assumed identical). The switching of the channels may be made very rapid if the switch schematically shown at 29 as controlling the electromagnets is an electronic switch of any of various conventional constructions.

If neither of the electromagnets is excited, switch 29 being in its neutral position, the incident wave is equally distributed between the two lateral channels, provided that the frequency $f$ of this wave is comprised in the impedance-matching band of the apparatus. If $f$ is outside the blocking band of the filters 11 and 11', the incident energy is distributed between the three channels of the T 26 according to a law which depends on the impedance-matching characteristics of the T structure.

In a variation, the tuning frequencies of each of the two filters can be different from each other and the apparatus then functions as a selective director for waves of different frequencies and/or different tuning bands.

The device in FIG. 7 is a non-reciprocal selective filter. The central frequency of its very narrow blocking band may be mechanically adjustable. It can use a guide or any cross-sectional form, this being generally true for the other devices herein disclosed. It allows almost all of the energy of an electromagnetic wave to be absorbed in a cutoff band of about $F/1000$. F being the mean operating frequency, $F/1000$ represents the width of the absorption band of the concerned apparatus. $F/1000$ thus represents the range within which the absorption band is adjusted. If F is 10000 mc./s. width of the absorption band is 10 mc./cs. adjustable within plus or minus 50 mc./s.

The device in FIG. 7 comprises a section 31 of a guide of rectangular cross section in which a parallelopiped ferrite element 34 is arranged as in the case of the filter in FIG. 3. Here the magnetic field is produced by a permanent magnet 32 held in the correct position by a support 33 so arranged that it allows the magnet to be displaced both towards and away from the ferrite element to vary the field strength as earlier explained, and also displaced parallel to a narrow wall of the guide to vary the position of the field axis relative to the longitudinal plane of symmetry of the ferrite element also, as explained earlier. A cover 35 of magnetic material (soft iron for instance) encloses the whole of the device.

The permanent magnet constituted by a small cylindrical block of magnetic material is placed against the small wall of the guide near the input or output plane of the ferrite. The axis of this magnet does not pass through the median line of the guide.

Given the dimensions of the ferrite element, and the frequency of the wave propagated in the guide, a value for the intensity of the magnetic field and a position for the magnet may be determined so that almost all the energy of the said wave will be absorbed due to the mode conversion occurring within the ferrite element as earlier explained. A displacement of the permanent magnet 32 towards and away from the ferrite element 34 allows the central frequency of the cutoff band of the filter to be varied within restricted limits due to the resulting variations in field strength, earlier described.

The applied magnetic field has an intensity lower than 100 Oersted. The ratio between the incident energy and the transmitted energy in the central frequency F of the pass band is 40 db. This central frequency can be adjusted in a band equal to $F/100$. Outside the band in which the incident energy is absorbed the losses are of the order of a few db.

It has already been explained that the filter in FIG. 7 is non-reciprocal, that is to say that the energy is absorbed only for one direction of propagation. In the opposite direction the losses in the entire band are of the order of a few decibles.

The filters represented in FIGS. 3 and 7 are in fact directive couplers or converters between the modes $TE_{10}$ and $TE_{01}$. The first of these (FIG. 3) is reciprocal, that is to say it is independent of the direction of propagation of the electromagnetic wave and in it all or part of the incident energy is transmitted from one mode in to the other since the axis of the applied magnetic field $H_0$ substantially coincides with the median plane M–N. The central frequency of the functioning of the selective filter and its band width are defined by the values given to the parameters of the system.

The second filter (FIG. 7) is a converter between the modes $TE_{10}$ and $TE_{01}$ which is not reciprocal, that is to say it exhibits this property only for one direction of propagation, and in it all or part of the incident energy is transmitted from one mode into the other since the axis of the applied magnetic field $H_0$ is above or below the median plane MN. The central frequency of the cutoff band of the selective filter and its bandwidth are defined by the values given to the parameters of the system earlier explained.

FIG. 9 illustrates an equivalent circuit diagram for either of the devices disclosed with reference to FIG. 3 or FIG. 7.

The wave guide considered as a bimodal line is represented by two distinct independent lines, one transmitting the mode $TE_{10}$, the other the mode $TE_{01}$. The mode-converting ferrite element with its controlling magnet means can be represented as a localized switching element C interposed in the line $TE_{10}$, and operable for putting the two lines in parallel and constituting a distributor of energy between these two lines.

The length of the prism of ferrimagnetic material determines that of the line L2, i.e. length over which both modes can propagate through the device, the terminal planes of this prism corresponding to the short circuit planes $\pi_1$, $\pi_2$ of the line L2 transmitting the wave of mode $TE_{01}$.

Assume first that the equivalent circuit of FIG. 9 represents the device earlier described with reference to FIG. 3. In this case the mode-converting switch C is reciprocal in its action. The incident wave at E in the line $TE_{10}$ is completely converted in mode as it passes through mode-converting switch device C, and is thereby in effect coupled towards the line $TE_{01}$ in the direction of propagation of $\pi_1$ towards $\pi_2$ and is then reflected from the short circuit plane $\pi_2$ (as well as from plane $\pi_1$ which is positioned so that the reflected waves are cophasal), comes back along the same line and, considering the reciprocity of the action of mode-converting device C, is sent back into the input branch of the line $TE_{10}$. If the reciprocal coupling effect is partial instead of being total, the uncoupled portion of the energy can be propagated in the line $TE_{10}$ towards any device that may be connected at S to the output branch of this line.

It is now assumed that the equivalent circuit diagram of FIG. 9 is supposed to represent the device of FIG. 7, then the mode-converting switch device C should be regarded as being non-reciprocal in its action and it allows coupling in one direction only, that of the line $TE_{10}$ towards the line $TE_{01}$ for example. The incident wave at E in the line $TE_{10}$ is mode-converted as it passes through device C and is thereby completely coupled towards the line $TE_{10}$; it is propagated in the direction from $\pi_1$ towards $\pi_2$, is reflected, as in the case last described from the equivalent short circuit plane $\pi_2$ and comes back into the same line. When, on its return, it reaches the directive coupler C, it cannot be coupled back to line $TE_{10}$ since the mode of the wave is not reconverted back to the original mode because of the non-reciprocity of the coupling, and is sent back towards the line $TE_{01}$; it is therefore stored ("trapped") in the section of line $TE_{01}$ and is there dissipated, bearing in mind the non-zero losses of the ferrimagnetic material. When the non-reciprocal mode-converting effect is only partial instead of being total, the unconverted portion of the energy can be transmitted into the line $TE_{10}$ towards any suitable utilization device connected to the channel S.

FIG. 10 illustrates an equivalent circuit diagram for another embodiment of the invention which involves the association in series of several, two as shown, selective filters of the type already described with reference to FIGS. 3, 7 and 9.

Although the apparatus now being described is depicted only by means of its equivalent circuit shown in FIG. 10, its practical construction will be readily ascertained by those familiar with the art from a study of the ensuing description and in the light of the earlier disclosure given herein.

Basically, said apparatus may comprise a straight length of rectangular wave guide having a relatively long strip of ferrite arranged longitudinally therein, adjacent to one of the narrow walls of the guide. With each of two longitudinally spaced areas of the ferrite element there is associated a respective magnetizing means for controllably applying a magnetizing field to said area in a direction normal to the narrow wall of the guide, and each such magnetizing means may be similar to the electromagnet 15 (FIG. 3) or the permanent magnet 32 (FIG. 7).

It will be evident from previous explanation that the equivalent circuit diagram for such a device will be such as that shown in FIG. 10. This equivalent circuit includes a first line L1 for propagation of the $TE_{10}$ mode wave, and a limited length of the $TE_{01}$ line L2 being determined by the length of the ferrite element. The two separately operable mode-converting switching elements, such as separately energizable electromagnets, are represented as the two boxes C1 and C2.

In operation, it may first be assumed that the actions of both mode converter "switches" C1 and C2 are reciprocal and total. When neither of the switches is energized with a magnetic field normal to the narrow guide wall, a wave applied at input E is passed to the output S directly, since no mode conversion occurs. If now both elements C1 and C2 are simultaneously energized as by applying a common electric pulse to the magnetizing windings thereof, then the incoming wave at E is subjected to a first mode conversion in element C1, so that it is transferred to the line L2. Here it undergoes a fresh mode conversion in element C1 and is transferred back to the line LI, and issues at output S.

The device of FIG. 10 is thus seen to act as a controllable transmission line whose effective electrical length can be selectively controlled between two different values.

Another possible type of operation of the device schematically represented by the circuit diagram of FIG. 10 can be produced if one of the mode-converter elements, e.g. C1, is non-reciprocal, while the other, C2, is reciprocal. (It will be recalled that the degree of reciprocity of a mode-converting device according to the invention can be controlled by suitably presetting or adjusting the degree of symmetry of the centre axis of the magnetizing field in relation to the median longitudinal plane of the ferrite strip). In such case, the mode-converter switch C1 may be continuously energized with a durable, or permanent, magnetic field, while the other switch C2 may be selectively energized with pulses.

In these conditions, an input wave applied at E, is first converted to the alternative mode (specifically from $TE_{10}$ to $TE_{01}$ as shown here) in device C1, thereby transferred to line L2, and in the absence of an energizing pulse applied to device C1, the wave energy is trapped or stored in the line section L2, as earlier described with reference to FIG. 9 in the case where the element C therein was non-reciprocal. At each energizing pulse applied to the second mode-converter switch element C2, the energy stored in the line L2 is released and transferred back to line L1 and thence to the output S of the device. The device therefore, can serve to pulse-modulate U-H-F wave energy applied to its output.

As already mentioned, the number of mode-converting elements or switches such as C1, C2, provided in a device of the general type shown in FIG. 10, may be greater than the two shown. Various other modifications and possible applications of the invention will be apparent to those familiar with the art.

We claim:

1. A microwave mode-converting structure comprising a rectangular wave guide having an input end connectable to a source of microwaves, at least one elongated element of ferromagnetic material positioned within the guide proximate to a narrow wall thereof, the long dimension of said element extending longitudinally of said guide, and means creating a magnetic field for magnetizing said element in a direction essentially normal to said narrow wall, the strength of the lines of force of said field being the same at any given radius from the axis of the magnetic field whereby a $TE_{n0}$ mode wave applied to the wave guide input will be converted to a $TE_{0p}$ mode wave.

2. The mode converting structure defined in claim 1, including means for controlling the strength of the field.

3. The mode converting structure defined in claim 1, wherein said field creating means comprises an electromagnet and an energizing circuit therefor, and means for controlling the voltage applied to said circuit.

4. A microwave mode converting structure comprising a rectangular wave guide having an input end connectable to a source of microwaves, an elongated element of ferromagnetic material positioned within the guide proximate to a narrow wall thereof, the long dimension of said element extending longitudinally of the guide, means creating a magnetic field for magnetizing said element in a direction essentially normal to said narrow wall, a median longitudinal plane of the element normal to said narrow wall containing the axis of the magnetic field the strength of the lines of force of said field being the same at any given radius from the axis of the magnetic field whereby a $TE_{n0}$ mode wave applied to the wave guide input will be reciprocally converted to a $TE_{0p}$ mode wave.

5. A microwave mode converting structure comprising a rectangular wave guide having an input end connectable to a source of microwaves, an elongated element of ferrimagnetic material positioned within the guide proximate to a narrow wall thereof, the long dimension of the element extending longitudinally of the guide, means creating a magnetic field for magnetizing said element in a direction essentially normal to said narrow wall, the lines of force of said field being symmetrically related angularly in respect to a longitudinal plane normal to said narrow wall and containing the axis of the magnetizing field, whereby a $TE_{n0}$ mode wave applied to the waveguide input will be converted to a $TE_{0p}$ mode wave, and means for displacing said field-creating means in a direction parallel to said narrow wall for controlling the degree of reciprocity of said conversion.

6. A microwave structure comprising a rectangular wave guide having an input leg connectable to a source of microwaves and having two output legs, a pair of elongated elements of ferrimagnetic material positioned within said output legs and each proximate to one of those walls of the wave guide that are parallel to the plane of polarization of said microwaves, the long dimensions of both elements extending longitudinally of the output legs of the guide, magnetizing means associated with the respective elements and selectively energizable to create magnetic fields for magnetizing said elements in directions essentially normal to said plane of polarization and containing the axis of the magnetizing field, and means for selectively energizing said magnetizing means, whereby to switch said microwaves to a selected one of said output legs.

7. A microwave structure comprising a rectangular wave guide having an input end connectable to a source of microwaves, an elongated element of ferrimagnetic material positioned within the guide proximate to one of those walls thereof that are parallel to the plane of polarization of said microwaves, the long dimension of said element extending longitudinally of the guide, at least two magnetizing means associated with longitudinally spaced areas of said element and selectively energizable to create magnetic fields magnetizing said element in said spaced areas thereof in directions essentially normal to said plane of polarization and containing the axis of the magnetizing field, and means for selectively energizing said magnetizing means whereby selectively to convert the mode of said microwaves from a $TE_{n0}$ mode to a $TE_{0p}$ mode intermediate said areas and thereby selectively to modify the effective propagation path of said microwaves through the wave guide.

8. The structure defined in claim 7, wherein each of said magnetizing means is positioned to create a magnetic field which is symmetrical both in angle and in position in respect to a median longitudinal plane of the related element normal to the electric vector of said input microwaves.

9. The structure defined in claim 8, including means for simultaneously energizing and deenergizing both magnetizing means.

10. The structure defined in claim 7, wherein an input one of said magnetizing means is arranged to create a magnetic field which is asymmetrically positioned in respect to a median longitudinal plane of the related element normal to the electric vector of said input microwaves, and the other magnetizing means arranged to create a magnetic field positioned symmetrically in respect to said median plane of its related element.

11. The structure defined in claim 10, including means for durably energizing said input magnetizing means and intermittently energizing said second magnetizing means.

12. A microwave mode converting structure comprising a rectangular wave guide having an input end connectable to a source of microwaves, at least one elongated element of ferrimagnetic material positioned within the guide proximate to one of those walls thereof that are parallel to the plane of polarization of said microwaves, the long dimension of said element extending longitudinally of said guide, and means creating a magnetic field for magnetizing said element in a direction essentially normal to said plane of polarization, the strength of the lines of force of said field being the same at any given radius from the axis of the magnetic field whereby a $TE_{n0}$ mode wave applied to the wave guide input will be converted to a $TE_{0p}$ mode wave.

References Cited

UNITED STATES PATENTS

| | | | |
|---|---|---|---|
| 2,948,868 | 8/1960 | Reeves | 333—24.2 X |
| 2,972,122 | 2/1961 | Schafer | 333—24.1 X |

OTHER REFERENCES

Comptes Rendus des Seances de L'Academie des Sciences, Oct. 24, 1960, pp. 1738–1740 relied upon.

The International Dictionary of Physics and Electronics—D. Van Nostrand, Princeton, N.J., copyright 1956, GR 250 QC515, pp. 283–284.

HERMAN KARL SAALBACH, Primary Examiner

P. L. GENSLER, Assistant Examiner

U.S. Cl. X.R.

333—21, 24.1, 73